US005428904A

United States Patent [19]

Rutz

[11] Patent Number: 5,428,904

[45] Date of Patent: Jul. 4, 1995

[54] METHOD AND APPARATUS FOR DRYING SEWAGE SLUDGE WITH A DRYING GAS THAT IS ITSELF DRIED AND RECIRCULATED

[75] Inventor: Andreas Rutz, Lindau, Germany

[73] Assignee: Lindauer Dornier Gesellschaft mbH, Lindau, Germany

[21] Appl. No.: 140,243

[22] Filed: Oct. 21, 1993

[30] Foreign Application Priority Data

Oct. 21, 1992 [DE] Germany ........................ 42 35 422.6

[51] Int. Cl.[6] ........................ C02F 11/12; F26B 25/00; B01D 53/26

[52] U.S. Cl. ........................................ 34/219; 34/224; 34/475

[58] Field of Search ................. 34/219, 223, 224, 225, 34/218, 212, 215, 216, 376, 379, 473, 474, 475, 491, 498

[56] References Cited

U.S. PATENT DOCUMENTS

| | | | |
|---|---|---|---|
| 3,314,159 | 4/1967 | Betz | 34/219 |
| 3,470,708 | 10/1969 | Weil et al. | 62/271 |
| 3,488,971 | 1/1970 | Meckler | 62/271 |
| 3,705,461 | 12/1972 | Parkes | 34/219 |
| 3,844,737 | 10/1974 | Macriss et al. | 55/34 |
| 4,253,825 | 3/1981 | Fasano | 34/215 |
| 4,509,272 | 4/1985 | Graff | 34/473 |
| 4,653,199 | 3/1987 | McLeod et al. . | |
| 5,038,498 | 8/1991 | Woolsey | 34/225 |
| 5,144,754 | 9/1992 | Persson | 34/491 |

FOREIGN PATENT DOCUMENTS

| | | |
|---|---|---|
| 3518323 | 11/1986 | Germany . |
| 3625013 | 1/1988 | Germany . |
| 4013761 | 10/1991 | Germany . |

OTHER PUBLICATIONS

Chemical Engineering, Aug. 15, 1988 "The Key to Driving Solids" by Paul Y. McCormick pp. 113 to 122.

*Primary Examiner*—Henry A. Bennet
*Assistant Examiner*—William C. Doerrler
*Attorney, Agent, or Firm*—W. G. Fasse; W. F. Fasse

[57] ABSTRACT

Moist sewage sludge is dried in a sludge dryer having several zones. The initial moisture content of the sewage sludge may range up to 80% by weight, while the dried bulk material shall have a remainder moisture content of about 5% by weight. The drying gas temperature is maintained at a level up to 50° C. to avoid activating additives that may be present in the sludge in the form of harmful substances to avoid the entry of these substances into the atmosphere. Furthere, the escape of processing air that has a noxious odor is avoided by passing the air through a deodorizer. The drying gas itself is reconditioned by reducing its moisture in a separate gas drying circuit from which the dried gas is again returned as a drying gas into the sludge dryer. A gas drying agent, such as a hygroscopic material is used in the gas dryer and the gas drying agent itself is regenerated by withdrawing moisture therefrom in a regenerating circuit.

18 Claims, 1 Drawing Sheet

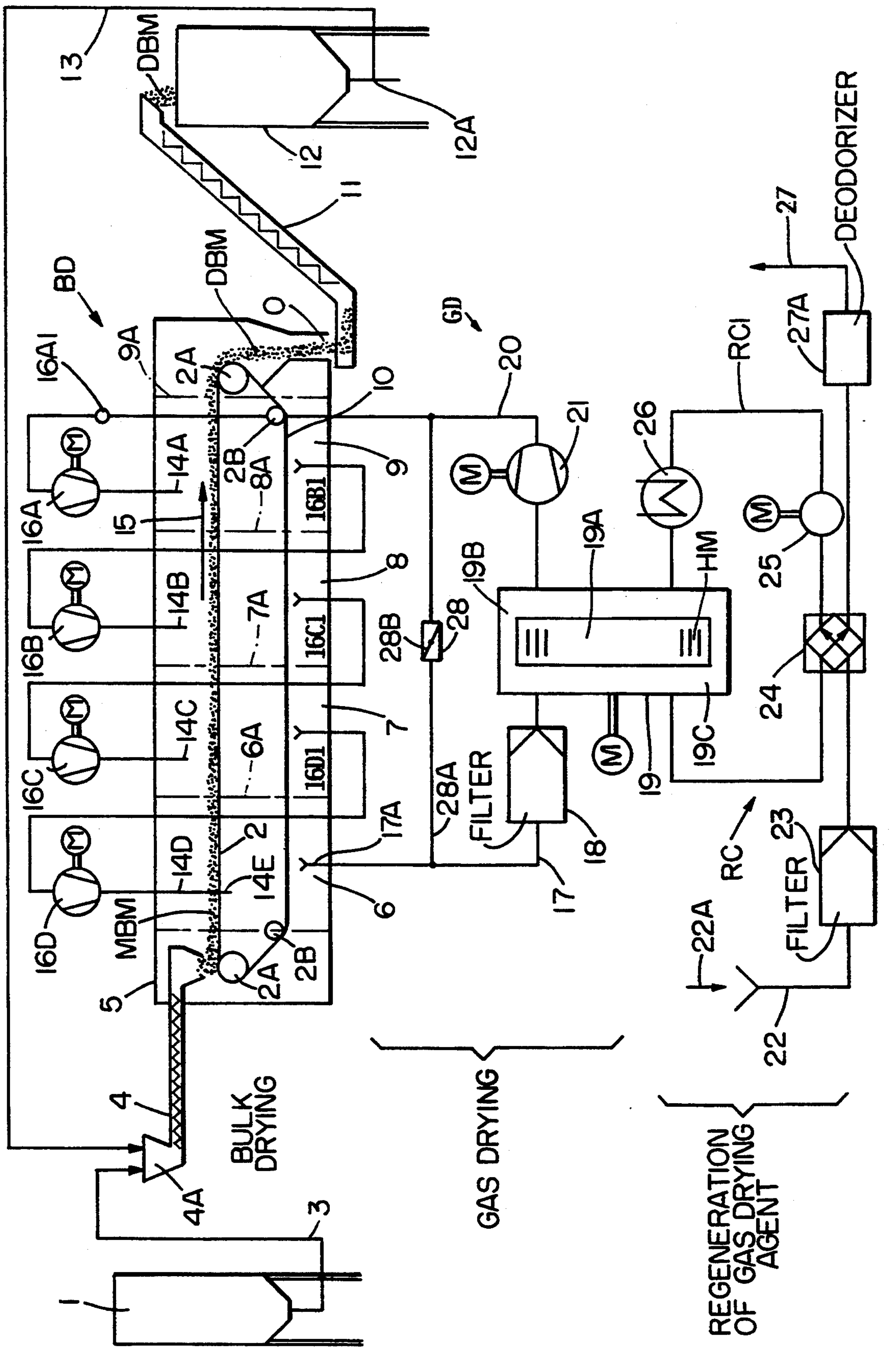
BULK DRYING
GAS DRYING
REGENERATION OF GAS DRYING AGENT
DEODORIZER
FILTER
FILTER
BD
GD
RC
RC1
DBM
DBM
MBM
HM
M
1
2
2A
2B
3
4
4A
5
6
6A
7
7A
8
8A
9
9A
10
11
12
12A
13
14A
14B
14C
14D
14E
15
16A
16A1
16B
16B1
16C
16C1
16D
16D1
17
17A
18
19
19A
19B
19C
20
21
22
22A
23
24
25
26
27
27A
28
28A
28B

METHOD AND APPARATUS FOR DRYING SEWAGE SLUDGE WITH A DRYING GAS THAT IS ITSELF DRIED AND RECIRCULATED

FIELD OF THE INVENTION

The invention relates to drying moist sewage sludge by a gas stream to which the sludge is exposed in a dryer housing. Gas that has absorbed moisture is itself dried and recirculated through the dryer housing. The sludge is preferably exposed in a pasty form to the drying gas.

BACKGROUND INFORMATION

Sewage sludge contains solid components, water, and additives. The sludge is fed through an infeed conveyor which transports the material into a sludge dryer housing that may comprise several drying zones. The drying gas is caused to envelope the sludge, whereby the drying sludge has a temperature that is kept below the activating temperature of the additives in the sludge. It is necessary to reduce the water or moisture content of the sludge to a moisture remainder that facilitates the further handling and/or treatment of the dried material.

German Patent Publication DE-OS 3,518,323 (Sevar), published on Nov. 27, 1986 discloses a method and apparatus for drying of sewage sludge, wherein the initially liquid sewage sludge is predried to form a sludge of a pasty consistency. The pasty sludge is then pelletized to form particles that have a relatively large surface, such as flat pellets or flakes. These large surface particles are then exposed to a drying gas flow. The known method wants to provide a dried sludge that has an easily adjustable remainder moisture content and that result is to be achieved with as small an energy input as possible. A remainder moisture content of around 5% by weight is supposed to be achieved in a drying apparatus that combines a predryer with a conveyor dryer passing through a housing in which the predried particles are exposed to a drying air stream. The drying air stream has a temperature of about 180° C. when it enters the dryer housing and it exits the dryer housing at a temperature of about 80° C. German Patent Publication 3,518,323 does not disclose, nor does it make any suggestion with regard to the recovery of the drying gas.

German Patent Publication DE-OS 4,013,761 (Sevar), published on Oct. 31, 1991, describes a method and apparatus quite similar to those described in the first mentioned German Patent Publication 3,518,323. As in the first mentioned publication, the drying gas stream also meanders repeatedly through the pelletized bulk material travelling on a screen conveyor. However, the temperature is to be kept so low that additives in the bulk material that frequently contain harmful substances will be retained in the bulk material, thus preventing the escape of harmful substances into the drying air. For this purpose the drying air is heated within a range of about 70° to 75° C. At these temperatures water condenses within the dryer housing. The condensate must be collected and treated in a settling pool, whereby harmful substances remain in the settling pool, where these substances cause a problem regarding their safe removal.

OBJECTS OF THE INVENTION

In view of the above it is the aim of the invention to achieve the following objects singly or in combination:

- to dry initially moist sewage sludge, at such temperatures that the remainder moisture content will be controllable at about 5% by weight, while the drying shall take place at such drying gas temperatures that an activation of additives, especially harmful additives in the sludge is avoided;
- to dry the drying gas so that it can be repeatedly recirculated or fed back through a housing of sludge dryer;
- to avoid the formation of a condensate in the dryer housing that would include harmful substances if it is being formed;
- to avoid the escape of drying gas that contains harmful substances into the atmosphere;
- to deodorize any regenerating gas that is discharged into the atmosphere; and
- to operate two parallel circuits, one of which is a drying circuit for the sewage sludge and the other circuit regenerates a hygroscopic medium that is used for removing moisture from the drying gas.

SUMMARY OF THE INVENTION

The drying method according to the sludge invention is characterized in that the drying gas that has taken up moisture in the dryer is circulated in a first processing circuit from a dryer housing to a gas demoisturizer, where the moist gas is dried and the resulting dry gas is recirculated into the dryer housing. Simultaneously a second regenerating circuit removes moisture from the gas demoisturizer, also referred to herein as gas dryer as opposed to the sludge dryer.

The apparatus according to the invention combines a through-flow sludge dryer with a gas demoisturizer or gas dryer. The sludge dryer cooperates with a conveyor such as a screw conveyor that feeds the moist sludge into the through-flow dryer, which has several zones each with its own fan. A screen conveyor belt travels through the dryer housing to feed the dried sludge into an output collector. The moist gas exiting from the sludge dryer passes through a pipe, through the gas dryer, and back into the sludge dryer. The gas dryer is connected to a second parallel drying circuit for removing moisture from the gas dryer. The gas dryer preferably comprises a hygroscopic material, such as silica gel, zeolite and high hygroscopic salt, which is regenerated by the moisture removal from the gas dryer and thus from the hygroscopic gas drying material.

It is an important feature of the invention that the drying gas has a temperature within the range of about 30° C. to 50° C, preferably about 40° C. to about 50° C. This temperature is below the activating temperature of any additives in the sludge, yet it makes it possible to reduce the initial sewage sludge moisture content which is about 80% by weight, to a value of about 5% by weight in the dried sludge. As a result, the drying gas leaves the sludge dryer with a high relative humidity. The moist gas is passed through a gas dryer under conditions which assure an optimally efficient operation of the gas dryer to produce a dried gas for reuse. These conditions involve the volume of the moist gas supplied into the gas dryer, its relative humidity, and its temperature. Once the moist gas has been dried in the gas dryer, the resulting dry gas is recirculated into the sludge dryer.

In the above mentioned second gas circulating circuit which runs in parallel to the sludge drying circuit, moisture held by the moist drying gas coming out of the sludge dryer is itself removed by exposing the moist gas to a hygroscopic medium as mentioned above. The withdrawn humidity is discharged to the atmosphere, preferably after passing an auxiliary gas flow that has taken up the humidity, through a deodorizer. The auxiliary gas flow is preferably a fresh air flow. Preferably or suitably the auxiliary air flow for regenerating the hygroscopic medium is heated to a temperature of about 220° C. However, this temperature is not too critical and a wide range of temperatures is suitable for the auxiliary air flow that withdraws humidity from the hygroscopic medium thereby regenerating it for repeated use. Generally, the temperature of the auxiliary regenerating air flow will depend on the operating conditions of the gas dryer.

The apparatus according to the invention combines, as mentioned above, a through-flow sludge dryer with a drying gas dehumidifier, which is connected in parallel, so to speak, to the sludge dryer in such a way that a gas inlet of the gas dryer receives moist gas from a gas outlet of the sludge dryer and an outlet of the gas dryer is connected to a gas inlet of the sludge dryer to recirculate dried gas repeatedly into the sludge dryer. The sludge dryer receives sludge at its input end from a sludge supply device. Further, a second auxiliary circuit for regenerating the drying capacity of the gas dryer, for example, by demoisturizing a hygroscopic material in the gas dryer, is connected in parallel to the first mentioned gas dryer circuit. The two circuits cooperate with each other.

Advantages of the invention are seen in that the low sludge drying temperature within the range of about 30° C. to 50° C. treats the sludge in a protective manner. Stated differently, the additives in the sludge are not mobilized or liberated, whereby their discharge into the atmosphere is avoided. The escape of noxious odors is also avoided. This feature has the important advantage that exhaust air treatments, for example, by using so-called bio-washers has been obviated. The present method and apparatus are especially suitable for realization within a wide range of dimensions so that the present method and apparatus is particularly useful in connection with sewage treatment plants, whereby the present apparatus is adaptable to a wide range of plant sizes. Due to the low treatment temperatures, dust is not generated and hence the danger of an explosion due to dust formation is avoided. A particularly efficient use is envisioned in smaller sewage treatment plants in smaller communities.

BRIEF DESCRIPTION OF THE DRAWING

In order that the invention may be clearly understood, it will now be described, by way of example, with reference to the single figure of the accompanying drawing, showing a block diagram of the present apparatus.

DETAILED DESCRIPTION OF A PREFERRED EXAMPLE EMBODIMENT AND OF THE BEST MODE OF THE INVENTION

The figure shows a sewage sludge dryer BD having a housing 5 with an inlet connected to a sewage sludge supplier, for example in the form of a screw conveyor 4 that feeds moist sewage sludge having a moisture content of up to about 80% wt. in a pasty form onto a screen belt 10 of an endless conveyor 2 operatively supported by support rollers 2A, at least one of which is a drive roller and by guide rollers 2B. The screw conveyor 4 receives bulk material from a storage bin or silo 1 through a feed conduit or pipeline 3. The dryer housing 5 is divided, for example, into four zones 6, 7, 8, and 9 by partitions 6A, 7A, 8A and 9A of conventional construction. In an example embodiment the total drying area in all four zones was 15 $m^2$.

According to the invention a gas drying and circulating circuit GD is connected in parallel to the sewage sludge dryer BD for drying the moist gas that emerges from the sewage sludge dryer and for returning dried drying gas back into the sewage sludge dryer BD. A regenerating circuit RC which regenerates a gas drying agent such as a hygroscopic material HM used in the gas drying circuit GD comprises a gas dryer 19, including a conveyor device 19A driven by a motor M. Incidentally, all motors in the figure are designated by the letter M. The screen conveyor belt 10 of the conveyor 2 transports the initially moist sewage sludge MBM from an inlet of the housing 5 to an outlet O where the now dry sewage sludge DBM is discharged into a further conveyor 11, such as a screw conveyor that feeds the dry sewage sludge DBM into a collecting bin 12. An outlet 12A of the collecting bin is connected through a feedback pipeline 13 to the inlet hopper 4A of the feed-in screw conveyor 4. With the aid of the feedback pipeline 13 it is possible to return at least some of the dried sewage sludge DBM to the inlet of the system to thereby modify the moisture content of the moist pasty sludge MBM entering into the dryer housing 5.

The drying gas is circulated through the sludge dryer BD with the help of four fans 16 each driven by its own motor M for exposing the sludge on the screen conveyor belt 10 to the drying gas. Each fan 16 is allocated to one of the above mentioned drying zones 6, 7, 8, or 9. Each fan 16 has an inlet 16A1 to 16D1 for receiving drying gas and an outlet 14A to 14D for blowing drying gas into the respective drying zone through the bulk material layer on the screen conveyor belt 10 of the conveyor 2. The drying gas flows below the screen belt 10 into the respective gas inlet 16B1, 16C1, 16D1 and 17A of the gas drying circuit GD. The gas inlet 16A1 of the first blower 16A that blows into the drying zone 9, is connected to an outlet pipe 20 that forms part of the gas drying circuit GD. The inlet 16B1 of the blower 16B that blows into the drying zone 8 receives drying gas that has passed through the bulk material and through the conveyor belt 10 in the zone 9.

The drying gas inlet 16C1 of the blower or fan 16C receives gas in the zone 8. The inlet 16D1 of the last blower or fan 16D receives gas in the zone 7. The inlet 17A of the gas drying circuit GD receives moist gas in the zone 6. Since the gas inlet 16A1 of the first blower 16A is connected to the outlet pipe 20 of the gas dryer circuit GD, dry gas is supplied into the zone 9 of the sludge dryer BD where the sludge is direct. The drying gas picks up moisture from the bulk material on the conveyor belt 10 the upper run of which moves from left to right as indicated by the arrow 15, whereby the moisture content of the drying gas increases from right to left, while the moisture content of the sewage sludge on the conveyor belt 10 also increases from right to left. This feature of the invention makes sure that already dried sewage sludge cannot pick up moisture from relatively moist drying gas.

The moist drying gas entering into the gas drying circuit GD through the inlet 17A passes through the pipe 17 and a filter 18 into the gas dryer 19 in which a conveyor 19A driven by a motor M transports a gas drying agent, such as the above mentioned hygroscopic materials back and forth between a gas drying zone 19B and a regenerating zone 19C in which the gas drying agent HM is regenerated by the flow of gas, for example, fresh air, in the regenerating circuit RC. The gas drying circuit GD includes a fan 21 connected with its inlet to the gas drying zone 19B of the gas dryer 19 and with its outlet to the above mentioned pipe 20 leading to the inlet 16A1 of the blower 16A. Thus, the gas drying circuit GD is connected in parallel to the series connected gas flow in the bulk dryer BD. A flap valve 28 is connected by a pipeline 28A in parallel to the gas drying circuit GD that includes the filter 18, the gas drying zone 19B, and the blower 21 connected in series with one another. The flap valve 28 has a control flap 28B that is shown in its closed position. The valve 28 is used to adjust the volume of gas passing through the gas drying circuit. The flap valve 28 is used for adjusting the operation of the gas dryer 19 to an optimal operational state with regard to the relative humidity and temperature of the regenerated drying gas that leaves the circuit GD, e.g. at a temperature of 50° C.

The regenerating circuits RC comprises a circulating pipeline RC in which there are connected a heat exchanger 24, a motor driven blower or fan 25, and a heater 26. The circulating pipe RC1 is connected to the inlet and outlet of the regenerating section 19C of the gas dryer 19. Fresh air indicated by the arrow 22A enters into a fresh air supply pipeline 22 and passes through a filter 23 and then through the heat exchanger into the regenerating circuit pipeline RC1. The outlet portion of the regenerating circuit RC1 leads through the heat exchanger into a discharge pipe line 27 leading to the atmosphere, preferably through a deodorizer 27A of known construction, e.g. a charcoal filter.

In operation the regenerating circuit RC, or rather the fresh air pumped into the regenerating circuit, withdraws moisture from the gas dryer 19, more specifically from the hygroscopic material HM in the gas dryer 19. The heat exchanger 24 uses the heat of the discharge from the regenerating circuit RC to preheat the fresh air flowing into the regenerating circuit RC.

The dry substance of the moist sewage sludge MBM entering the bulk dryer BD is normally within the range of 20 to 30% by weight, the remainder being a moisture content by weight. The discharged dry sewage sludge DBM has a dry substance of about 95% by weight, the remainder being about 5% by weight of moisture. As shown in the figure, the blower outlets 14A to 14D are all arranged so that the drying gas, such as air, is introduced onto the top of the sewage sludge to then pass through the screen belt 10 of the conveyor 2. However, the arrangement may also be reversed. In other words, the air inlets 16B1, 16C1, 16D1, and 17A may be arranged in the housing 5 to face the upper surface of the sludge, while the blower outlets 14A, 14B, 14C, and 14D are arranged to face in a direction for discharging the drying air upwardly against the screen belt 10, preferably against the upper run of the screen belt carrying the sewage sludge. The air inlets and air outlets may also be arranged to alternate from drying zone to drying zone so that in one zone the blower outlet is arranged below the conveyor, while in the next zone it is arranged above the conveyor and so on. It has been found to be especially efficient if the drying air is introduced below the screen conveyor belt 10 in those zones where the sludge is still relatively moist, namely, where the dry substance of the sewage sludge is within the range of about 20 to 30% by weight, and then to introduce the drying gas on top of the sewage sludge in those zones where the sludge is getting drier and drier.

An advantageous operation is also achieved if during the drying operation the differential pressure between the suction and pressure sides of the individual dryer zones is optimized. Such optimization can be achieved by a proper adjustment of the blowers 16A to 16D and by respectively selecting their capacities.

In an experiment with a total drying surface of 15 $m^2$ in all four dryer zones, the following results were achieved when starting with a moist sewage sludge having a dry substance content of 20% by weight, the remainder being moisture. The material throughput through the dryer was 320 kg/h, based on the weight of the moist sewage sludge coming out of the screw conveyor 4. The drying gas temperature at the drying gas input 16A1 of the sludge dryer was about 50° C. The temperature at the moist gas exit 17A of the sludge dryer was about 30° C. The dry substance of the dried sludge DBM at the output O of the sludge dryer BD was 95% by weight, the remainder being moisture. The temperature of the drying gas entering at 16A1 can be controlled by controlling the output of the heater 26.

Although the invention has been described with reference to specific example embodiments, it will be appreciated that it is intended to cover all modifications and equivalents within the scope of the appended claims.

What I claim is:

1. A method for drying pasty, moist sewage sludge, comprising the following steps:

(a) feeding said pasty, moist sewage sludge into an inlet of an enclosed sludge dryer and onto a screen conveyor moving in said enclosed sludge dryer from said inlet to an outlet of said enclosed sludge dryer, (b) passing a dry drying gas into said enclosed sludge dryer for removing moisture from said pasty, moist sewage sludge, whereby moist gas is formed, (c) feeding said moist gas through a gas dryer to form dry, renewed drying gas, (d) recirculating said renewed drying gas through said enclosed sludge dryer, (e) removing moisture from said gas dryer to permit a substantially continuous operation, and (f) introducing said drying gas into said enclosed sludge dryer below said screen conveyor where said screen conveyor carries pasty sewage sludge having a dry substance content of 20 to 30% by weight, the remainder being moisture, and by introducing said drying gas above said screen conveyor where said screen conveyor carries pasty sewage sludge having a dry substance content above 20 to 30% by weight, so that moister sewage sludge is contacted by said drying gas through said screen conveyor and so that drier sewage sludge is contacted by said drying gas from above said screen conveyor to reduce dust formation.

2. The method of claim 1, further comprising adjusting a differential pressure between a compression inlet and a suction outlet of said sludge dryer to a value that takes into account parameters for an optimal efficiency of said sludge dryer.

3. The method of claim 1, wherein said parameters comprise any one of the following: the moisture content of said pasty sewage sludge, the density of said pasty sludge, and the temperature of said drying gas.

4. The method of claim 1, further comprising adjusting said moist gas to the requirement of an efficient operation of said gas dryer by varying any one of the following parameters of said moist gas, namely its relative humidity, its volume, and its temperature.

5. The method of claim 1, further comprising controlling the temperature of said drying gas within the range of about 30° C. to about 50° C.

6. The method of claim 1, further comprising controlling the moisture content of said pasty sewage sludge by feeding back dried sewage sludge into the pasty moist sewage sludge being fed into said enclosed sludge dryer.

7. The method of claim 1, wherein said moisture removing step comprises contacting said moist gas with a hygroscopic material, and wherein said contacting step comprises drying said hygroscopic material for regenerating said hygroscopic material for further use.

8. The method of claim 7, wherein said drying of said hygroscopic material comprises preheating fresh air with heat derived from exhaust gas that has contacted said hygroscopic material and by further heating said fresh air prior to contacting said hygroscopic material with further heated fresh air.

9. The method of claim 8, further comprising deodorizing said exhaust gas.

10. An apparatus for drying pasty moist sewage sludge, comprising a dryer housing having an inlet for pasty moist sewage sludge and a dried material outlet, a screen conveyor in said dryer housing for transporting sewage sludge from said inlet through said dryer housing to said outlet, at least one drying gas feed port for feeding drying gas into said dryer housing, a drying gas discharge port for removing moist gas from said dryer housing, means for transporting drying gas through said dryer housing and into contact with said pasty, moist sewage sludge, a gas dryer circuit connected to said gas feed port and to said gas discharge port of said dryer housing for drying moist gas and returning dried drying gas back into said dryer housing, a regenerating circuit connected to said gas dryer circuit for removing moisture from gas in said gas dryer circuit, and wherein said dryer housing comprises a plurality of dryer zones and a corresponding plurality of blowers for transporting drying gas through said zones in such a way that driest drying gas contacts driest sewage sludge and so that moistest drying gas is discharged where the moisture content of said pasty, moist sewage sludge is highest.

11. The apparatus of claim 10, wherein said gas dryer circuit is connected in parallel to a gas flow through said dryer housing, and wherein said regenerating circuit is independent of said gas dryer circuit, said gas dryer circuit comprising a gas dryer (19) holding hygroscopic material for drying moist gas.

12. The apparatus of claim 10, wherein said means for transporting drying gas comprise at least one blower in said gas dryer circuit and at least one blower in said dryer housing.

13. The apparatus of claim 10, wherein said regenerating circuit comprises a heat exchanger, a blower, and a heater connected in series with each other to form a series circuit, said gas dryer circuit comprising a gas dryer (19) connected to said series circuit, said regenerating circuit further comprising a fresh air inlet pipe passing through said heat exchanger and an exhaust gas pipe also passing through said heat exchanger which is connected to said series circuit for preheating fresh air.

14. The apparatus of claim 13, further comprising a deodorizer connected to said exhaust gas pipe.

15. The apparatus of claim 10, further comprising a feedback pipeline (13) for feeding dried sewage sludge back to said inlet to adjust the moisture content of pasty, moist sewage sludge being fed into said dryer housing.

16. The apparatus of claim 10, further comprising a bypass pipeline (28) connected in parallel to said gas dryer circuit and a valve in said bypass pipeline for adjusting a moist gas supply to said gas dryer circuit.

17. The method of claim 1, further comprising feeding drying gas into said enclosed sludge dryer so that the moisture content of said drying gas increases as the moisture content of said pasty sewage sludge increases along said screen conveyor, whereby already dried sewage sludge cannot pick up moisture from relatively moist drying gas.

18. A method for drying pasty, moist sewage sludge, comprising the following steps:

(a) feeding said pasty, moist sewage sludge into an inlet of an enclosed sludge dryer and onto a screen conveyor moving in said enclosed sludge dryer from said inlet to an outlet of said enclosed sludge dryer, (b) passing a dry drying gas into said enclosed sludge dryer for removing moisture from said pasty, moist sewage sludge, whereby moist gas is formed, (c) feeding said moist gas through a gas dryer to form dry, renewed drying gas, (d) recirculating said renewed drying gas through said enclosed sludge dryer, (e) removing moisture from said gas dryer to permit a substantially continuous operation, and (f) controlling the temperature of said drying gas within the range of about 30° C. to about 50° C.

* * * * *

UNITED STATES PATENT AND TRADEMARK OFFICE
CERTIFICATE OF CORRECTION

PATENT NO. : 5,428,904

DATED : July 4, 1995

INVENTOR(S) : Andreas Rutz

It is certified that error appears in the above-identified patent and that said Letters Patent is hereby corrected as shown below:

Col. 4, line 54, replace "direct." by --driest.--.

Col. 6, line 65, replace "claim 1," by --claim 2,--.

Signed and Sealed this

Fourteenth Day of November, 1995

Attest:

BRUCE LEHMAN

Attesting Officer

Commissioner of Patents and Trademarks